Figure 1:
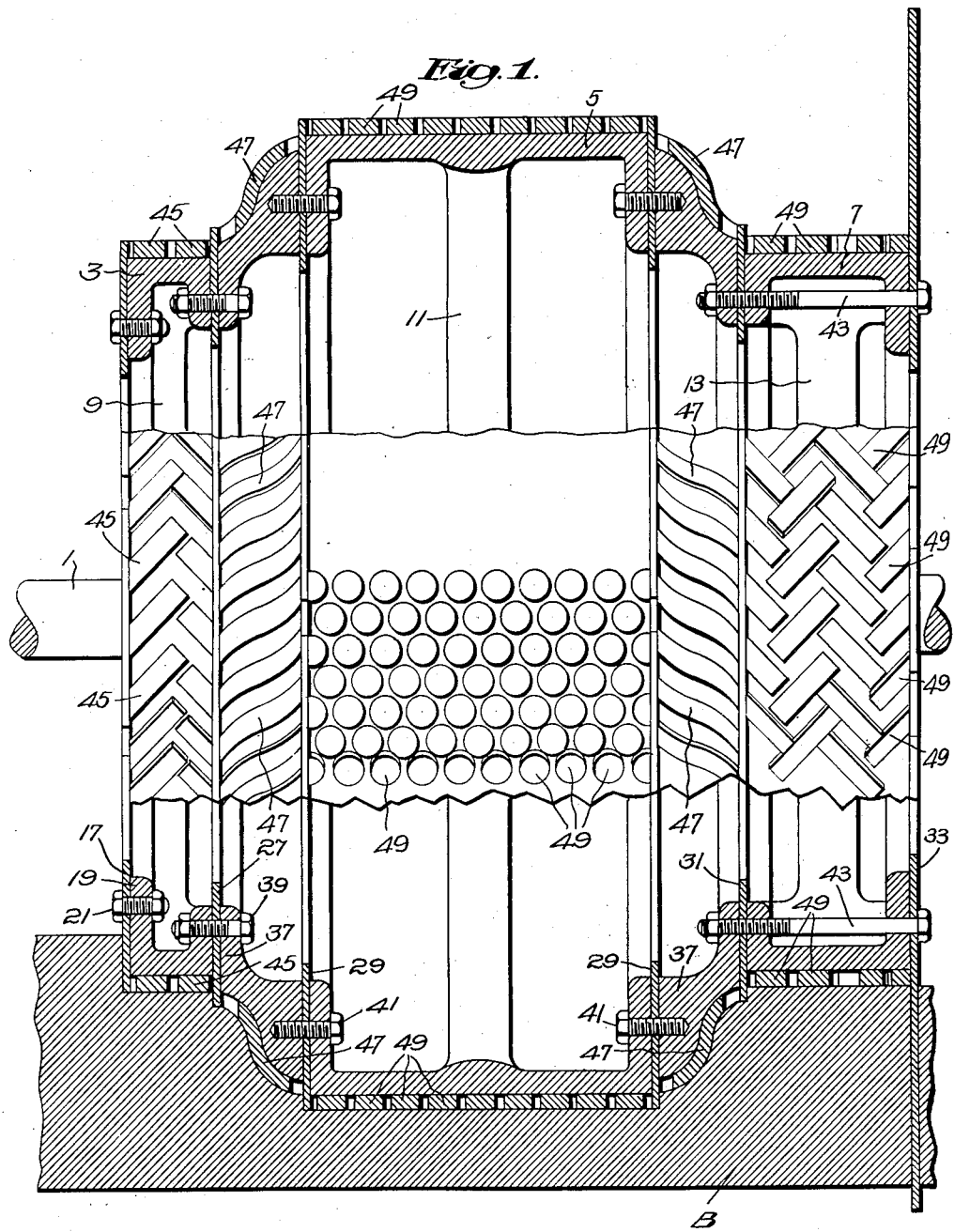

July 3, 1934.                P. S. LEGGE                1,965,384
                          STONE CUTTING TOOL
                    Filed Feb. 10, 1930        2 Sheets-Sheet 1

Inventor:
Peter S. Legge

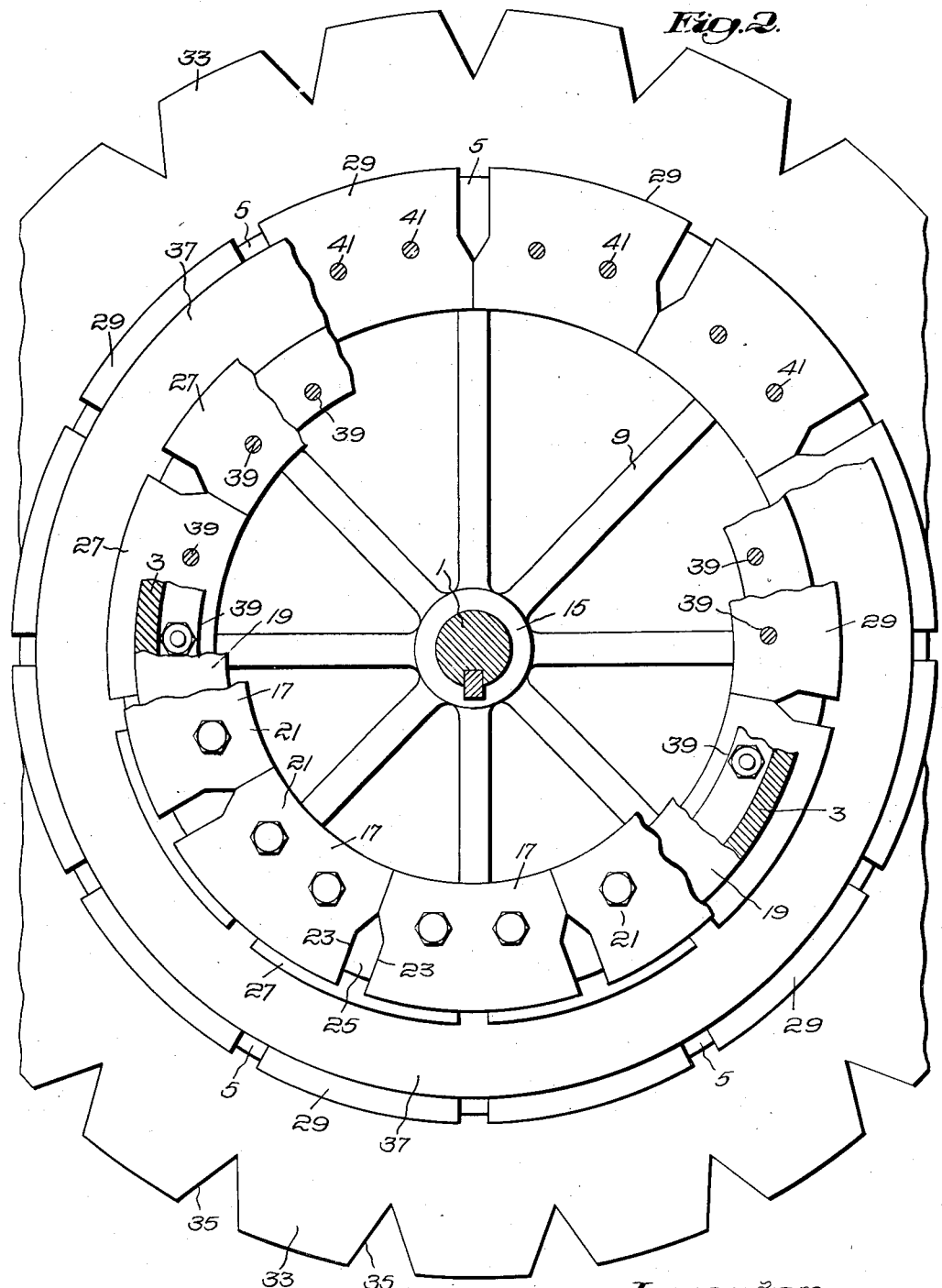

Patented July 3, 1934

1,965,384

UNITED STATES PATENT OFFICE 1,965,384

STONE CUTTING TOOL

Peter S. Legge, Long Island City, N. Y.

Application February 10, 1930, Serial No. 427,139

5 Claims. (Cl. 125—5)

My invention relates to stone working tools, particularly to rotary cutters for finishing stone blocks and forming the same into various shapes.

The invention will be best understood from the following description when read in the light of the accompanying drawings of an embodiment of the invention selected for illustrative purposes, while the scope of the invention will be more particularly pointed out in the appended claims.

In the drawings:—

Fig. 1 is an elevation of a rotary cutter constructed according to the invention with parts in longitudinal section; and Fig. 2 is an end elevation looking from the left of the cutter constructed according to Fig. 1 with parts broken away and with the abrasive blocks omitted.

Referring to the drawings, I have selected for illustrating the invention a rotary cutter arranged for cutting a sunken panel in the block B of stone.

As shown, the cutter is mounted on a shaft or arbor 1 driven in any suitable manner. On the shaft 1 in this embodiment of the invention are mounted pulleys 3, 5 and 7, the respective rims of which are joined by spokes 9, 11 and 13 to hubs 15 (Fig. 2), the latter keyed or otherwise suitably secured in non-rotatable relation to the shaft.

As shown, at the lefthand side of the pulley 3 is a disk saw, herein formed of a plurality of sections 17 secured to the annular radial flange 19 of the pulley by bolts 21, the ends of the sections 19 being cut away as indicated at 23 (Fig. 2) to form the notches 25 for a purpose hereinafter referred to. At the left hand side of the pulley 3 is a similar disk saw formed of a plurality of sections 27, while at the opposite sides of the pulley 5 are disk saws formed of a plurality of sections 29. Similarly at opposite sides of the pulley 7 are disk saws 31 and 33, the former as shown being formed of sections and the latter as an integral annular ring the periphery of which is provided with the notches 35. It will be understood that any of the disk saws may be formed of sections or as integral blades, as desired, and that in general these saws may have any suitable form known to the art.

As illustrated, the pulleys 3 and 7 are spaced from the pulley 5 by rings 37 the peripheral surfaces of which have ogee profiles as viewed in radial cross-section. Herein the rings 37 are secured to the adjacent pulleys by bolts 39, 41 and 43 which also act to secure the adjacent disk saws in assembled relation with the pulleys and rings.

It will be observed from Fig. 1 that the diameters of the disk saws are greater than the maximum diameters of the pulleys and rings, so that when the tool is rotated the disk saws will saw cuts of different depths in the block of stone. Herein, the disk saw 33 acts to finish the edge of the stone or completely or partially sever the block of stone at that point, the operation being what is termed in the art that of edging the block, and it will be understood that if desired a second saw may be provided for edging the other edge of the block.

For removing the stone between the saw cuts formed by the disk saws the peripheral faces of the pulleys and rings may be provided with cutters herein shown in the form of blocks 45, 47 and 49, the blocks 45 shown on the narrower pulleys being rectangular prisms arranged in spaced, staggered, oblique relation with their ends overlapping, while the blocks 49 on the pulley 5 are in the form of small circular disks arranged in spaced, staggered, overlapping relation. The blocks 47 on the rings 37 are in the form of oblique strips having in profile ogee shaped faces to surface the stone to the desired shape. The blocks 45, 47 and 49 may be of molded carborundum secured to the pulleys in any suitable manner, as for example by orange shellac, or may be metal blocks, say of mild steel welded to the faces of the pulleys and rings.

In all cases the cutting blocks preferably abut with the disk saws, the blocks preferably being formed to present large surfaces in contact with the sides of the saws. By this construction rounding of the ends of the blocks at the edges of the pulleys is prevented. In the absence of this construction the corner portions of the sunken panel would gradually become filleted as the cut is progressed due to the wearing away of the corners of the blocks at the ends of the pulleys. This is effectively prevented by the construction described.

When carborundum cutters are employed water is fed to the cut, said water flowing through the spaces between the blocks and being pocketed in the notches of the peripheries of the disk saws. When steel blocks are employed water and abrasive, the latter preferably in the form of small chilled iron shot, are fed to the cut, the spaces between the blocks and the notches in the saw teeth carrying the shot into and through the cut so that essentially the cutting of the stone is performed by the shot rather than by the saws and blocks. However, in the appended claims both forms of blocks are included by the words "cutters", "stone cutting blocks" and words of like import.

In practice, when employing steel blocks and chilled shot, best results commonly will be secured when the peripheral speed is about 2200 feet per minute, and, when employing carborundum cutters, with peripheral speeds which are much higher, say, from 5000 to 7000 feet per minute. These factors however may be varied within wide limits, and commonly will be varied to suit the horse-power or other limitations of the motors available, the character of the stone operated upon, and the speed of cutting desired or enforced by other conditions. Under common conditions the diameters of the pulleys will be in the order of from two to five feet. It is to be understood, however, that the invention is not limited to the employment of any particular speed or diameter, and that the above figures are given merely as particular examples of what applicant has found to be suitable under particular conditions found in many stone working plants, which conditions vary widely.

It will be understood that wide deviations may be made from the form of cutter herein shown without departing from the spirit of the invention, and that the invention is not limited to cutting sunken panels, it being applicable to cutting raised shapes, plane faces, and the like.

I claim:

1. A stone working tool of the type having a power driven arbor comprising, in combination, means for cutting the stone by abrasive action with an uncreased finished surface including a plurality of projecting spaced blocks having surfaces of material area on a plurality of coaxial surfaces of revolution of different diameters for acting on the same face of a block of stone, disk saw means coaxial with said surfaces positioned between each pair of said surfaces and having diameters equal to the diameters of the adjacent surfaces of greatest diameter, the cuts formed by said disk saw means abutting with the surfaces cut by said blocks, and disk saw means coaxial with said surfaces of revolution for edging said block of stone, said last mentioned disk saw means forming a cut abutting with the portion of the face of said stone cut by said blocks.

2. A stone working tool of the type having a power driven arbor comprising, in combination, means for cutting the stone by abrasive action with an uncreased finished surface including a plurality of projecting spaced staggered blocks having surfaces of material area on a plurality of coaxial surfaces of revolution of different diameters for acting on the same face of a block of stone, disk saw means coaxial with said surfaces positioned between each pair of said surfaces and having diameters not less than the diameters of the adjacent surfaces of greatest diameter, the cuts formed by said disk saw means abutting with the surfaces cut by said blocks, and disk saw means coaxial with said surfaces of revolution for edging said block of stone, said last mentioned disk saw means forming a cut abutting with the portion of the face of said stone cut by said blocks.

3. A rotary stone working tool for cutting a sharp cornered stepped recess in the stone having, in combination, an arbor, a disk saw on said arbor for cutting a slot in the stone one side of which slot forms the vertical rise of the step of said recess, and means on said arbor for cutting the transverse surfaces at the top and bottom of said step comprising means supporting a plurality of spaced staggered abrading blocks having outer working faces in surfaces of revolution of different diameters coaxial with said disk saw, said blocks being in overlapping relation circumferentially and longitudinally of the tool and those which are adjacent said disk saw abutting therewith at the opposite sides thereof for preventing rounding of the corners of said blocks at the ends of said surfaces.

4. A stone working tool having, in combination, disk saw means of relatively great diameter for edging a block of stone, a second disk saw means coaxial with the first mentioned disk saw means but spaced therefrom and of materially less diameter, and means for cutting the stone by abrasive action between the saw cuts formed by said disk saw means to form an uncreased surface including a plurality of projecting spaced staggered blocks arranged between said disk saw means in overlapping relation circumferentially and longitudinally of said tool and having working faces of material area in a surface of revolution of less diameter than said first mentioned disk saw means and of not greater diameter than said second disk saw means, said blocks adjacent said disk saw means abutting with the latter at said working faces of said blocks for preventing rounding of the corners of said blocks at the ends of said working faces.

5. A stone cutting tool having, in combination, a tool mandrel, a plurality of drums of different diameter on said mandrel, disk saw blades between adjacent drums and abutting with the latter, said blades being of greater diameter than the abutting portions of the adjacent drums, and means for cutting the stone between the saw cuts formed by said disk saw blades including spaced projecting blocks on the peripheral surfaces of said drums having approximately flat working surfaces of material area, said blocks adjacent said disk saw blades abutting therewith at opposite sides thereof at the working surfaces of said blocks.

PETER S. LEGGE.